US006906807B2

(12) United States Patent
Paritsky et al.

(10) Patent No.: US 6,906,807 B2
(45) Date of Patent: Jun. 14, 2005

(54) MEMBRANE TYPE OPTICAL TRANSDUCERS PARTICULARLY USEFUL AS OPTICAL MICROPHONES

(75) Inventors: Alexander Paritsky, Modi'in (IL); Alexander Kots, Ashdod (IL)

(73) Assignee: Phone - Or Ltd., Or Yehuda (IL)

( * ) Notice: Subject to any disclaimer, the term of this patent is extended or adjusted under 35 U.S.C. 154(b) by 298 days.

(21) Appl. No.: 10/102,715

(22) Filed: Mar. 22, 2002

(65) Prior Publication Data

US 2003/0179384 A1 Sep. 25, 2003

(51) Int. Cl.[7] .......... G01B 11/24
(52) U.S. Cl. .......... 356/601; 356/445
(58) Field of Search .......... 356/601, 445; 381/172

(56) References Cited

U.S. PATENT DOCUMENTS

| | | | | |
|---|---|---|---|---|
| 4,933,545 A | * 6/1990 | Saaski et al. | .......... | 250/227.14 |
| 5,262,884 A | * 11/1993 | Buchholz | .......... | 381/172 |
| 5,771,091 A | 6/1998 | Paritsky et al. | | |
| 5,969,858 A | 10/1999 | Funatsu | | |
| 6,091,497 A | 7/2000 | Paritsky et al. | | |
| 6,239,865 B1 | 5/2001 | Paritsky et al. | | |
| 6,552,328 B1 | * 4/2003 | Berlin et al. | .......... | 250/227.14 |

FOREIGN PATENT DOCUMENTS

| | | | |
|---|---|---|---|
| DE | 198 35 947 | * 2/2000 | .......... G02B/26/00 |

* cited by examiner

*Primary Examiner*—Zandra Smith
*Assistant Examiner*—Kara Geisel
(74) *Attorney, Agent, or Firm*—G.E. Ehrlich (1995) Ltd.

(57) ABSTRACT

An optical transducer includes a housing containing a light source and a light detector laterally spaced from the light source; and a deformable membrane mounted over the light source and light detector such that an inner surface of the membrane reflects light from the light source to the light detector to produce, from the light detector, an output electrical signal modulated in accordance with the deformations of the membrane. The inner surface of the membrane has a small central region of high light reflectivity to maximize the output electrical signal produced by the deformations of the membrane, and a large outer region of lower light reflectivity to minimize noise in the output electrical signal produced by multi-reflection of light from the light source to the light detector. The membrane is preferably formed in its outer region with circular corrugations coaxial with each other and with the central region of high light reflectivity to increase the deformability of the central region.

34 Claims, 2 Drawing Sheets

MEMBRANE TYPE OPTICAL TRANSDUCERS PARTICULARLY USEFUL AS OPTICAL MICROPHONES

FIELD AND BACKGROUND OF THE INVENTION

The present invention relates to optical transducers (sometimes referred to as optical sensors) which utilize optical means for sensing mechanical displacements, such as movements of a body or deformations of a membrane, and converting them to electrical signals. The invention is particularly useful in optical microphones for converting sound (manifested by acoustically produced deformations of a membrane) into electrical signals, and is therefore described below with respect to this application.

Optical transducers of this type are described, for example, in U.S. Pat. Nos. 5,771,091; 5,969,838; 6,091,497; and 6,239,865, the contents of which patents are incorporated herein by reference.

Such optical transducers generally comprise a housing including a light source and a light detector laterally spaced from the light source; and a deformable membrane mounted to the housing over the light source and light detector and having an inner surface to reflect light from the light source to the light detector in accordance with the deformations of the membrane. The light detector thus produces an output electrical signal modulated in accordance with the deformations of the membrane.

The membranes in optical microphones function differently from membranes in other known types of microphones, such as condenser microphones, electret microphones, and electro-dynamic microphones. In a condenser microphone, the membrane is used as a capacitor plate for varying capacitance in accordance with the deformations of the membrane, and is therefore made of a metal or of a plastic having a metal layer. In electret microphones, the membrane is generally made of a plastic covered by an electret material that possesses a constant electrical charge in relation to the opposite capacitor plate. In electro-dynamic microphones, the membrane is generally made of a plastic carrying an electrical coil that moves in a magnetic field produced by an electromagnet to modulate the electrical output in accordance with the deformations of the membrane.

In the foregoing types of microphones, the complete area of the membrane is generally used in the conversion of mechanical movement of the membrane into the outputted electrical signal. For this reason, the sensitivity of the microphone can generally be increased by increasing the size of the membrane in these microphones.

Many applications of optical microphones do not permit large size membranes as commonly provided in capacitor, electret, or electro-dynamic microphones. Therefore, there is a need to provide optical microphones (or other types of optical transducers) with an increased sensitivity while still enabling the use of relatively small size membranes.

BRIEF SUMMARY OF THE INVENTION

According to one aspect of the present invention, there is provided an optical transducer comprising: a housing including a light source and a light detector laterally spaced from the light source; and a deformable membrane mounted to the housing over the light source and light detector such that an inner surface of the membrane reflects, to the light detector, light emanating from the light source, and the light detector produces an output electrical signal modulated in accordance with the deformations of the deformable membrane; characterized in that the deformable membrane is mounted to the housing by a frame which fixes the outer peripheral edge of the membrane over an opening in the housing: and in that the inner surface of the deformable membrane has a small central region of high light reflectivity to maximize the output electrical signal produced by the deformations of the membrane, and a large outer region of lower light reflectivity to facilitate mounting the membrane and to minimize noise in the output electrical signal produced by multireflection of light from the light source.

According to further features in the described preferred embodiment, the optical transducer further comprises a frame mounting the deformable membrane to the housing; and a spacer between the housing and the frame, the spacer defining a predetermined space between the deformable membrane and the light source and light detector for producing relatively large, linear, changes in the output electrical signal in response to the deformations of the membrane. In the described preferred embodiments, the small central region of high light reflectivity is no greater than 500 microns in its transverse dimensions, and the spacing of the membrane from the light source and light detector is less than 50 microns.

Embodiments are described wherein the spacer is either a separate element from the frame, or integrally formed with the frame. In one described preferred embodiment wherein the spacer is integrally formed with the frame, the spacer is constituted of a plurality of axially-extending, peripherally-spaced projections integrally formed on the surface of the frame facing the light source and light detector.

In one described preferred embodiment, the deformable membrane and the frame are both made from a silicon wafer; preferably one or both are made of silicon dioxide.

According to another aspect of the present invention, there is provided an optical transducer, comprising: a housing including a light source and a light detector laterally spaced from the light source; and a deformable membrane mounted to the housing over the light source and light detector, and having an inner surface to reflect light emanating from the light source to the light detector and to produce, from the detector, an output electrical signal modulated in accordance with the deformations of the deformable membrane; the deformable membrane being formed in an outer region with at least one circular corrugation to increase the deformability of the central region of the membrane. Preferably, the membrane is formed with a plurality of circular corrugations coaxial with each other and with the central region.

As will be described more particularly below, the foregoing features enable optical transducers to be constructed having relatively high sensitivity and yet relatively small dimensions suitable for many applications of small-size optical microphones.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt was made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF A PRIOR ART CONSTRUCTION (FIG. 1)

Figure 1:
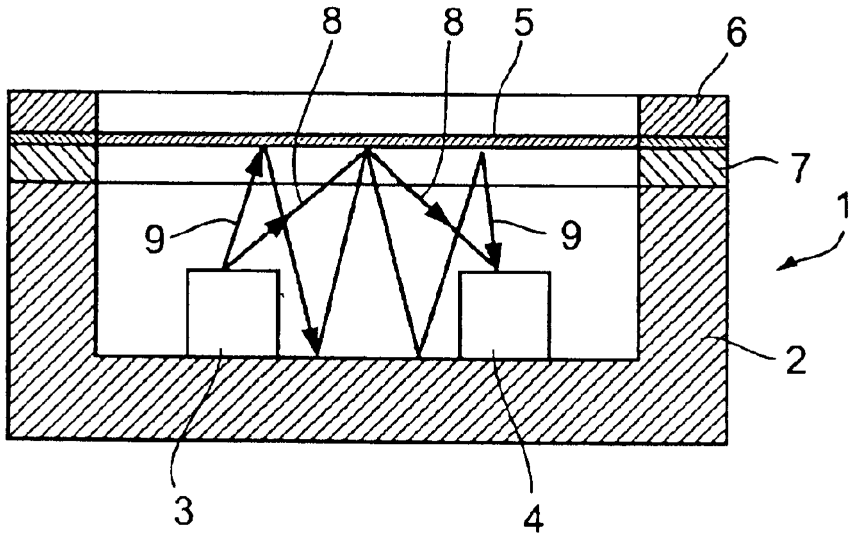
Fig. 1 (Prior Art)
FIG. 1 is a sectional view schematically illustrating the construction and operation of an optical transducer, or optical microphone, known in the prior art.

A prior art optical transducer, generally designated 1, is schematically illustrated in FIG. 1. It includes a housing 2 mounting a light source 3 and a light detector 4 laterally spaced from the light source. A deformable membrane 5 is mounted to housing 2 over the light source 3 and light detector 4 such that an inner surface of the membrane reflects light from the light source to the light detector.

As further shown in FIG. 1, membrane 5 is secured to the housing 2 by a frame 6, and is spaced from the facing surfaces of the light source 3 and light detector 4 by a spacer 7. FIG. 1 also schematically illustrates by arrows 8 and 9 the path of the light from light source 3 impinging the inner surface of membrane 5 and reflected from the membrane to the light detector 4. The light detector thus produces an output electrical signal modulated in accordance with the deformations of the membrane 5.

Light source 3 may be any suitable light source, such as a light-emitting diode (LED); and light detector 4 may be any suitable light-sensitive device, such as a photo sensitive diode. Membrane 5 is an acoustically sensitive membrane having an inner surface which reflects the light from light source 3 to the detector 4 to thereby cause the light detector 4 to output an electrical signal modulated in accordance with the deformations of the membrane.

Further details of the construction and operation of such optical transducers are set forth in the above-cited U.S. Patents, the contents of which are incorporated herein by reference.

A drawback in such optical transducers, however, is that the output signal generally includes a relatively high level of noise. This is believed to be caused by multiple reflections from the membrane of the light from the light source 3 to the light detector 4. Thus, variations in the light received by light detector 4 after a single reflection from the membrane 5, as indicated by light ray 8, are more closely correlated to the actual deformations of the membranes than the light received by the light detector after multiple reflection from the membrane, as indicated by light ray 9. The result is an output signal which has a relatively low signal-to-noise ratio, which thereby limits the overall sensitivity of the optical transducer.

DESCRIPTION OF PREFERRED EMBODIMENTS OF THE PRESENT INVENTION

Figure 2:
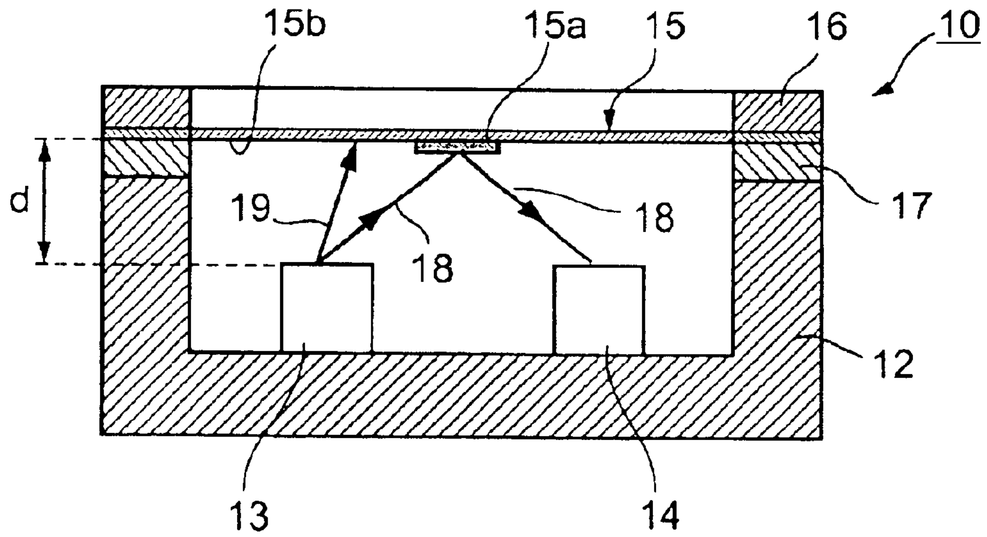
FIG. 2 schematically illustrates the construction and operation of an optical transducer in accordance with the present invention.
Figure 3:
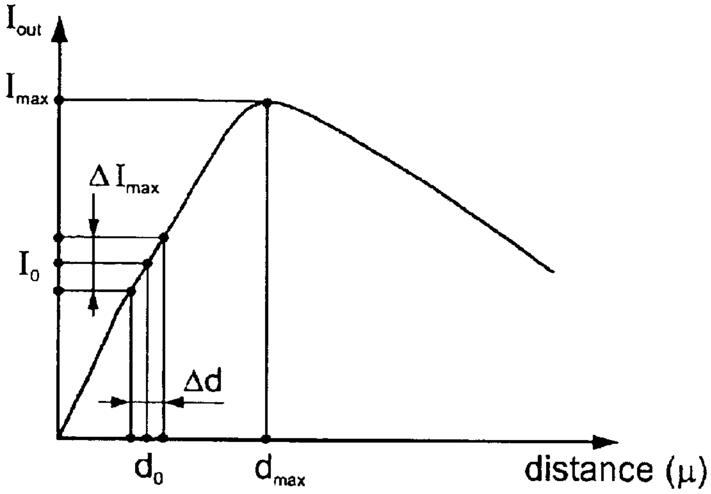
FIG. 3 is a graph illustrating the output signal of the optical transducer of FIG. 2 as a function of the distance (d) between the membrane and the light source and light detector.
Figure 4:
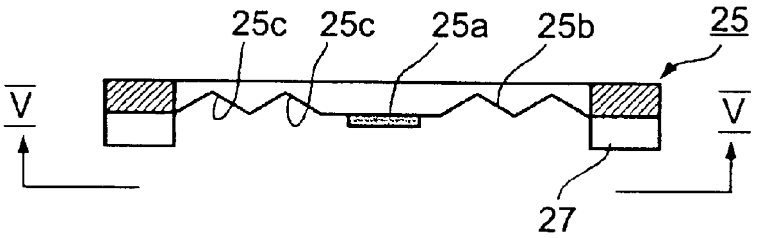
FIG. 4 illustrates another construction of membrane for an optical transducer in accordance with the present invention.
Figure 5:
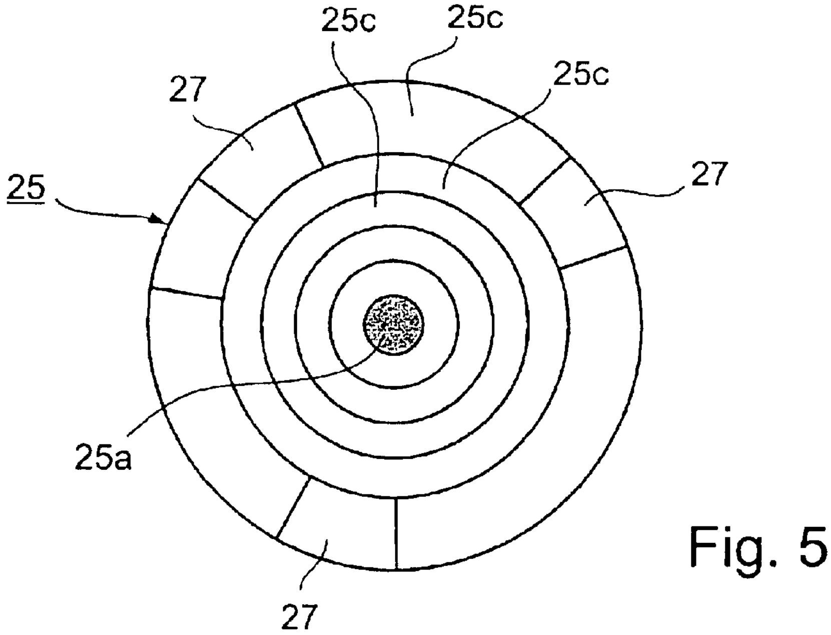
FIG. 5 is a bottom view, along line V—V, of the membrane of FIG. 4.

As indicated earlier, there are many applications for optical transducers, particularly optical microphones, requiring both high sensitivity and small dimensions. FIG. 2 illustrates an optical transducer in general, and an optical microphone in particular, constructed in accordance with the present invention especially useful in such applications; FIG. 3 illustrates the relationship of the output signal to the distance between the membrane and the light source and light detector in the optical transducer of FIG. 2 for obtaining optimal sensitivity; and FIGS. 4 and 5 illustrate another construction of deformable membrane which may be used in such optical transducers.

The Optical Transducer of FIG. 2

FIG. 2 illustrates one construction of optical transducer in accordance with the present invention, and therein generally designated 10. As shown in FIG. 2, the optical transducer includes a housing 12 mounting within it a light source 13 and a light detector 14 laterally of the light source. A membrane 15 is mounted around its outer peripheral edge to housing 12 by a frame 16 to overlie the light source 13 and light detector 14 and to be spaced therefrom by a spacer 17.

As shown in FIG. 2, the inner surface of membrane 15 has a small central region 15*a* of high light reflectivity and a larger outer region 15*b* of lower light reflectivity. The small central region 15*a* of high light reflectivity is effective to reflect the light from the light source 13 to the light detector 14 to produce an output signal from the light detector which is modulated in accordance with the deformations of the membrane. The larger outer region 15*b* of lower light reflectivity is effective to facilitate mounting the membrane 15 to the housing 12, and to minimize multi-reflections to light detector 14 of of the light emanating from light source 13. Thus, as shown in FIG. 2, substantially only the light rays from light source 13, represented by arrow 18, undergoing a single reflection by membrane 15, are received by the light detector 14; whereas the other light rays, as represented by ray 19, which would otherwise undergo multiple reflection before being received by the light detector 14, are not reflected to the same extent as light rays 18. The resulting output signal from light detector 14 thus has a relatively large signal-to-noise ratio, and therefore can be amplified according to the sensitivity required.

Preferably, the size of the small central region 15*a* of high light reflectivity is less than 0.5 mm (i.e., 500 microns). Since this is the surface of the membrane which produces the output signal, the membrane actually need be no larger than this size. However, for practical reasons, the membrane is preferably of a much larger size to facilitate its production and mounting to the housing; however, by making the larger outer region 15*b* of lower light reflectivity, the multi-reflection of light from the light source 13 to the light detector 14 is minimized.

The small central region 15*a* of high light reflectivity is preferably of circular configuration. The membrane 15 itself may also be of circular configuration, but may also be of another configuration, e.g., rectangular configuration.

Membrane 15 may be made of plastic or metal. For example, in some embodiments, the membrane could be made of a plastic film having a deposit of a high light reflectivity metal, such as gold or aluminum, in its small central region 15*a*. According to another embodiment, the membrane could be of aluminum foil wherein its small central region 15*a* is made highly reflective, whereas its outer region 15*b* is less reflective, e.g., by having a surface of oxidized aluminum or of another aluminum compound.

According to yet another embodiment, the deformable membrane 15, as well as its frame 16, may be made of a silicon wafer, such as of silicon dioxide, or one of the other materials described in International Publication No. WO 02/15636 A2, published Feb. 21, 2002, the contents of which are hereby incorporated by reference. Although the membrane described in that publication is for a condenser microphone, the membrane construction, as well as the various materials described in that publication for making the membrane, could also be used for the membrane in the present application but modified as described above. When such a membrane is used in the present application, the membrane may be integrally formed with its frame 16 and/or its spacer 17.

The Relationship of Output Signal to Membrane Spacing

FIG. 3 illustrates the relationship of the output signal produced by the optical transducer 10 as a function of the distance "d" between the inner surface of the membrane 15 and the outer surface of the light source 13 and the light detector 14. In FIG. 3, the horizontal axis (d) is in microns, and the vertical axis ($I_{out}$) is the change (in percentage) of the output signal as a function of the change in the distance "d".

As shown in FIG. 3, the maximum output signal ($I_{max}$) is produced when the distance "d" is ($d_{max}$). In the optical transducer of FIG. 2, ($d_{max}$) is about 100 microns. At this point, changes in the distance "d" caused by the deformations of the membrane will not produce significant changes in the output signal ($I_{out}$); that is, $\Delta I=0$.

In FIG. 3, the region "$d_o$" is the region having a slope which is maximum and substantially linear. Thus, any change in the distance ($\Delta d$) within this region ($d_o$), produced by the deformations of the membrane in response to the audio (or other) signals, will produce a maximum, substantially linear change in the output signal; that is, $\Delta I=max$.

Membrane 15 in optical transducer 10 should therefore be located within the region "$d_o$". This distance "$d_o$" is in the range of 30–50 microns in the construction illustrated in FIG. 3. It can be determined empirically according to the size and construction of each optical transducer and can be easily effected by providing a spacer 17 of the appropriate thickness.

The Embodiment of FIGS. 4 and 5

FIGS. 4 and 5 illustrate another construction of membrane that may be used in accordance with the present invention. The membrane illustrated in FIGS. 4 and 5, and therein generally designated 25, is also formed at its inner surface with a small central region 25*a* of high light reflectivity, and a larger outer region 25*b* of low light reflectivity. The outer region 25*b* is further formed with a plurality of circular corrugations 25*c* coaxial with each other and with the small central region 25*a*. Such corrugations increase the deformability of the small central region 25*a* when subjected to the acoustical vibrations.

The membrane illustrated in FIGS. 4 and 5 may also be constructed of silicon dioxide, or one of the other materials listed in the above-cited publication WO 02/15636 A2.

In the construction illustrated in FIGS. 4 and 5, membrane 25 is integrally formed with its frame 26 and with its spacer 27. As shown particularly in FIG. 5, the spacer 27 is constituted of a plurality of axially-extending, peripherally-spaced projections 27 integrally formed with the frame 26 and membrane 25, and facing inwardly towards the light source and light detector when mounted on the optical transducer.

FIG. 5 illustrates three such spacers 27, but any desired number could be provided. FIG. 5 also illustrates the membrane 25, together with its frame 26, of circular configuration, but both could also be of rectangular or other configuration. The small central region 15*a* of high light reflectivity, however, should preferably be of circular configuration.

While the invention has been described with respect to several preferred embodiments, it will be appreciated that these are set forth merely for purposes of example, and that many other variations, modifications and applications of the invention can be made.

What is claimed is:

1. An optical transducer, comprising:

a housing including a light source and a light detector laterally spaced from the light source;

and a deformable membrane mounted to said housing over said light source and light detector such that an inner surface of the membrane reflects, to said light detector light emanating from the light source, and the light detector produces an output electrical signal modulated in accordance with the deformations of the deformable membrane;

said deformable membrane being mounted to said housing by a frame which fixes the outer peripheral edge of the membrane over an opening in the housing;

said inner surface of the deformable membrane having a small central region of high light reflectivity to maximize said output electrical signal produced by the deformations of the membrane, and a large outer region of lower light reflectivity to facilitate mounting the membrane and to minimize noise in said output electrical signal produced by multi-reflection of light from said light source to said light detector said optical transducer further comprising a spacer between said housing and said frame; said spacer defining a predetermined space between said deformable membrane and said light source and light detector for producing relatively large, linear, chances in said output electrical signal in response to the deformations of the membrane.

2. The optical transducer according to claim 1, wherein said small central region of high light reflectivity is no greater than 500 microns in its transverse dimensions.

3. The optical transducer according to claim 1, wherein said small central region of high light reflectivity is of circular configuration having a diameter no greater than 500 microns.

4. The optical transducer according to claim 1, wherein the spacing of said deformable membrane from said light source and light detector is less than 50 microns.

5. The optical transducer according to claim 1, wherein said spacer is a separate element from said frame.

6. The optical transducer according to claim 1, wherein said spacer is integrally formed with said frame.

7. The optical transducer according to claim 6, wherein said spacer is constituted of a plurality of axially-extending, peripherally-spaced projections integrally formed on the surface of said frame facing said light source and light detector.

8. The optical transducer according to claim 6, wherein said deformable membrane and said frame are made from a silicon wafer.

9. The optical transducer according to claim 6, wherein said deformable membrane is of silicon dioxide and said frame is of silicon.

10. The optical transducer according to claim 1, wherein said deformable membrane is formed in said outer region with at least one circular corrugation coaxial with said small central region of high light reflectivity to increase the deformability of said small central region.

11. The optical transducer according to claim 1, wherein said deformable membrane is formed in said outer region with a plurality of circular corrugations coaxial with each other and with said small central region of high light reflectivity to increase the deformability of said small central region.

12. The optical transducer according to claim 1, wherein said small central region carries a deposit of a metal of high light reflectivity.

13. The optical transducer according to claim 12, wherein said metal is gold.

14. The optical transducer according to claim 12, wherein said metal is aluminum.

15. The optical transducer according to claim 1, wherein said deformable membrane is made of aluminum foil having a small central region of aluminum of high light reflectivity, and a large outer region of an aluminum compound of lower light reflectivity.

16. The optical transducer according to claim 1, wherein said deformable membrane is of a soft compliant material.

17. The optical transducer according to claim 1, wherein said deformable membrane is of a compliant plastic material and has a small central region of highly light reflecting metal.

18. An optical transducer, comprising:

a housing including a light source and a light detector laterally spaced from the light source;

and a deformable membrane mounted to said housing over said light source and light detector, and having an inner surface to reflect light emanating from said light source to said light detector and to produce from the light detector an output electrical signal modulated in accordance with the deformations of the deformable membrane;

said deformable membrane being formed in an outer region with at least one circular corrugation to increase the deformability of the central region of the membrane.

19. The optical transducer according to claim 18, wherein said deformable membrane is formed in said outer region with a plurality of circular corrugations coaxial with each other and with said central region.

20. The optical transducer according to claim 18, wherein the inner surface of said membrane is of high light reflectivity at said central region to maximize said output electrical signal produced by the deformations of the membrane, and is of lower light reflectivity in said outer region to minimize noise in said output signal produced by multi-reflection of light from said light source to said light detector.

21. The optical transducer according to claim 20, wherein said central region of high light reflectivity is no greater than 500 microns in its transverse dimension.

22. The optical transducer according to claim 20, wherein the spacing of said deformable membrane from said light source and light detector is less than 50 microns.

23. The optical transducer according to claim 18, wherein the optical transducer further comprises: a frame mounting the deformable membrane to said housing; and a spacer between said housing and said frame, said spacer defining a predetermined space between said deformable membrane and said light source and light detector for producing relatively large, linear changes in said output electrical signal in response to the deformations of said membrane.

24. The optical transducer according to claim 23, wherein said spacer is a separate element from said frame.

25. The optical transducer according to claim 23, wherein said spacer is integrally formed with said frame.

26. The optical transducer according to claim 25, wherein said spacer is constituted of a plurality of axially-extending, peripherally-spaced projections integrally formed on the surface of said frame facing said light source and light detector.

27. The optical transducer according to claim 25, wherein said deformable membrane and said frame are made from a silicon wafer.

28. The optical transducer according to claim 25, wherein said deformable membrane is of silicon dioxide and said frame is of silicon.

29. The optical transducer according to claim 18, wherein said central region carries a deposit of a metal of high light reflectivity.

30. The optical transducer according to claim 29, wherein said metal is gold.

31. The optical transducer according to claim 29, wherein said metal is aluminum.

32. The optical transducer according to claim 18, wherein said deformable membrane is made of aluminum foil having a small central region of high light reflectivity aluminum, and a large outer region of a lower light reflectivity aluminum compound.

33. The optical transducer according to claim 18, wherein said deformable membrane is of a soft compliant material.

34. The optical transducer according to claim 33, wherein said deformable membrane is of a compliant plastic material and has a small central region of high light reflectivity metal.

* * * * *